United States Patent [19]

Immler et al.

[11] Patent Number: 5,117,318

[45] Date of Patent: May 26, 1992

[54] ROTATIONAL POSITIONER LATCH FOR A MAGNETIC DISC STORAGE

[75] Inventors: Josef Immler, Puchheim; Ulber Armin, Unterschleissheim, both of Fed. Rep. of Germany

[73] Assignee: Siemens Aktiengesellschaft, Berlin and Munich, Fed. Rep. of Germany

[21] Appl. No.: 671,909

[22] PCT Filed: Jun. 5, 1989

[86] PCT No.: PCT/DE89/00372

§ 371 Date: Mar. 18, 1991

§ 102(e) Date: Mar. 18, 1991

[87] PCT Pub. No.: WO90/03029

PCT Pub. Date: Mar. 22, 1990

[30] Foreign Application Priority Data

Sep. 16, 1988 [WO] PCT Int'l Appl. ... PCT/DE88/00580

[51] Int. Cl.$^5$ .......................... G11B 5/54; G11B 21/22
[52] U.S. Cl. ..................... 360/105; 360/106; 360/98.01; 360/137
[58] Field of Search ............... 360/104, 105, 106, 137, 360/75, 86, 98.01

[56] References Cited

U.S. PATENT DOCUMENTS

| | | | |
|---|---|---|---|
| 4,562,500 | 12/1985 | Bygdnes | 360/105 |
| 4,647,997 | 3/1987 | Westwood | 360/105 |
| 4,710,834 | 12/1987 | Brand et al. | 360/105 |
| 5,041,934 | 8/1991 | Stefansky | 360/105 |
| 5,043,834 | 8/1991 | Kubo et al. | 360/105 |

FOREIGN PATENT DOCUMENTS 62-129983  6/1987  Japan .
2170644  8/1986  United Kingdom .

OTHER PUBLICATIONS

"5¼-in. Unit Holds 26 Megabytes", Electronics, Apr. 21, 1982, pp. 181, 182, 184.
"Design of a High Performance Rotary Positioner for a Magnetic Disk Memory", IEEE Transactions on Magnetics, vol. Mag. 17, No. 4, Jul. 1981, Winfrey et al.
"Motor in Spindle Gives Micro-Winchester Room for 140M Bytes", Mini-Micro Systems, Feb. 1983, pp. 143-148, Jack Swartz.

Primary Examiner—Aristotelis Psitos
Assistant Examiner—Alfonso Garcia
Attorney, Agent, or Firm—Hill, Van Santen, Steadman & Simpson

[57] ABSTRACT

In addition to comprising swivel arms (15) carrying magnetic heads (4), a swivel member (12) seated rotationally movable in a rotational positioner for a magnetic disc storage comprises carrier arms (14) carrying a movable element (16) of a magnetic drive system. A latch means that only releases the swivel member in the operating condition of the disc storage comprises a retainer element (23) radially projecting from the swivel member and also comprises a latch element (19). In the simplest case, this can be fashioned as a leaf spring that engages behind the retainer element when the swivel member enters into a predetermined latched position. For releasing the retainer element, a bipolar enable pulse (v) is supplied to the magnetic drive system (9, 10, 16), this enable pulse first moving the swivel member from the release position beyond the latched position, thereby disengaging the latch means and then moving past the disengaged latch element into the released position with maximum acceleration.

10 Claims, 4 Drawing Sheets

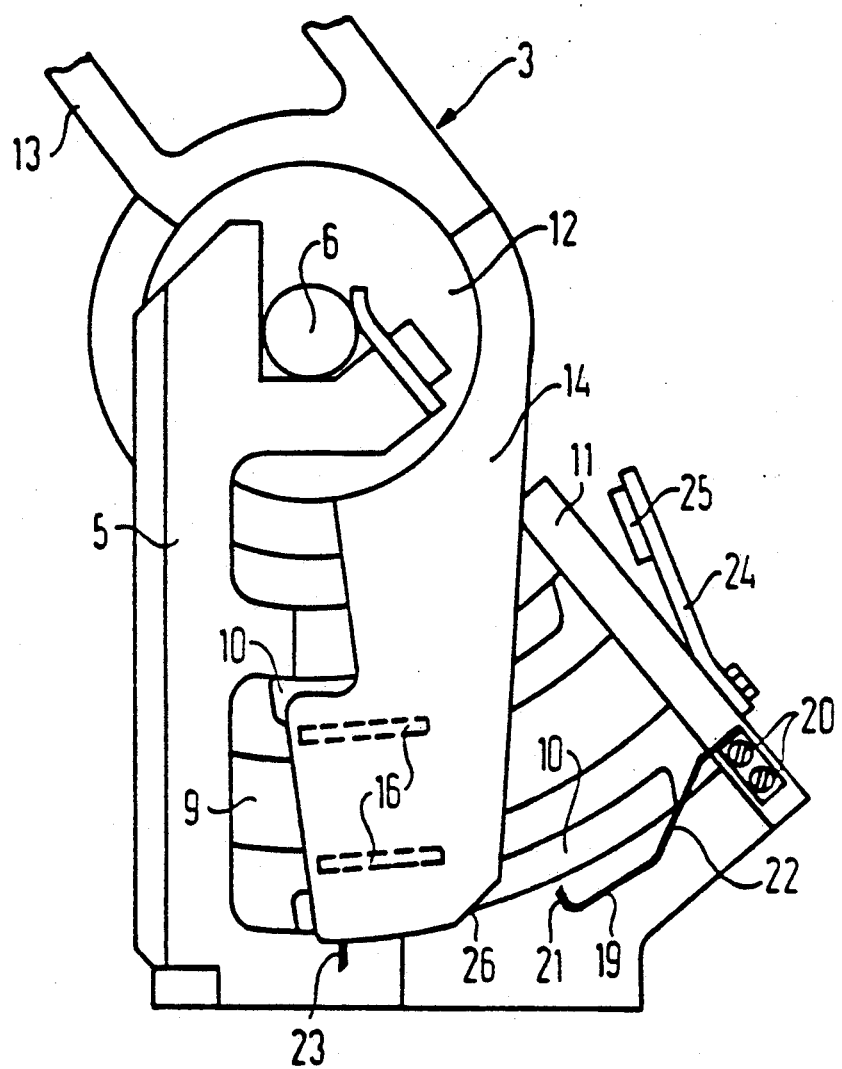
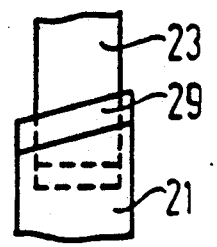

ROTATIONAL POSITIONER LATCH FOR A MAGNETIC DISC STORAGE

BACKGROUND OF THE INVENTION

The invention is directed to a rotational positioning means for a magnetic disc storage and, in particular, to a positioner for a magnetic disc storage including magnetic heads carried on a swivel member movable via a drive system and including a latch for blocking movement of the swivel member in an idle position.

Positioning means fashioned as rotational positioners have prevailed in magnetic disc storages, particularly given 5¼ and 3½ stores. Rotational positioners have a swivelling part that is seated rotationally movable on a positioning axis arranged parallel to the axis of a disc pack. This swivelling part comprises a plurality of swivel arms carrying magnetic heads and comprises carrier arms lying roughly opposite these swivel arms with respect to the positioning axis. These carrier arms carry either a coil that is deflected relative to stationary permanent magnets or a magnet, whereby the excited magnetic coil is then rigidly arranged. In the former instance, the rotational positioner is referred to as a swivel coil positioner; in the latter, it is referred to as magnetic armature positioner. The two types of rotational positioner are inherently equivalent. Leaving the structural differences out of consideration, the coil in combination with the permanent magnet or magnets shall be referred to below as a magnetic drive system of the rotational positioner.

Such rotational positioners are known, for example, from IEEE Transactions on Magnetics, Vol. MAG-17, No. 4, July 1981, pages 1392 ff or from Electronics, 21 April 1982, pages 181 ff. During ongoing operation, the magnetic heads, gliding on an air cushion, fly over the surface of the storage disc in non-contacting fashion. This air cushion collapses given downward transgression of a minimum relative speed between magnetic head and storage disc, so that the head lands on the disc surface. Such a landing dare not occur in the data region of the magnetic discs. A landing region that corresponds to an idle position of the rotational positioner is therefore usually defined on the magnetic storage disc. It is assured that the rotational positioner can be swivelled out of the idle position into the data region only when the disc storage drive is running.

In known rotational positioners, a latch means that only releases the rotational positioner after the disc storage drive has been activated is therefore provided. The latch means frequently has an enable magnet that allows a rotational motion of the swivel part only in the excited condition. In order to enable the rotational motion of the rotational positioner, the enable magnet is excited during the entire operating time of the magnetic disc storage, so that its armature remains attracted. The enable magnet must therefore be designed for continuous operation; at the same time, it represents an additional electromagnetic noise source during the operation of the magnetic disc storage.

In order to avoid these disadvantages, U.S. Pat. No. 4,710,834 discloses a positioner means for a magnetic disc storage comprising a latch means that has a latch magnetic instead of an enable magnet. The latch magnet is fashioned such in combination with a retaining spring that, following brief excitation, it mechanically holds itself and then releases the swivel part. The mechanical locking of the magnetic armature releases only when the swivel part itself swivels back into the idle position, so that the released magnetic armature blocks the swivel part. The dimensioning of the latch magnet is less critical in this solution since it is only briefly excited for the release of the swivel part. In the normal operating condition of the magnetic disc storage, moreover, the latch magnet carries no current and therefore does not form an electromagnetic noise source for the operation of the magnetic disc storage.

What the described latch mechanisms for rotational positioners nonetheless have in common is that, namely, a magnetic element that is at least briefly excited is provided in order to prevent rotational movement of the swivel part in the idle condition of the magnetic disc storage. Of necessity, however, a rotational positioner together with its latch mechanism is always arranged in the interior of the magnetic disc storage. The demand must therefore also be made of the latch mechanism that its condition satisfies clean room conditions at the time it is integrated and that, over and above this, it produces no dirt particles that could contaminate the interior of the magnetic disc storage insofar as possible during operation. Switched magnets having such operating properties and in the required, cleaned condition, however, are correspondingly expensive. It is nonetheless not assured that they always meet these demands.

U.S. Pat. No. 4,562,500 also discloses a latch means for a rotational positioner that requires no latch or enable magnet. Included in this latch means is a latch spring that is fixed laterally projecting at the swivel part of the rotational positioner and that points in the direction of the movement of the swivel piece when conducted out of the latched position. This movement, however, is opposed by a latch stop that is rotatably seated parallel to the axis of the rotational position and comprises a catch nose as well as a seating surface for the latch spring that proceeds at a right angle relative to the catch nose. The latch stop is under the pre-stress of a tension spring and thus prevents the rotational positioner from unintentionally running out of the latched position. The swivel part, however, releases itself. As soon as the drive of the rotational positioner is excited, the free end of the swivel part presses the latch spring against the catch nose and turns the catch stop while overcoming the opposing force of the tension spring. With the back edge of the seating surface, the catch stop thereby bends the catch spring and ultimately presses it out of the catch nose. The swivel part is thus freely movable as long as it does not return into the idle position.

It is advantageous in this known solution that no enable or, respectively, latch magnet is required. The type of release, however, is particularly disadvantageous. The swivel part itself thereby releases itself by a rotational motion in the direction of the operating position forced by the drive. If a reliable latching is to be guaranteed, a comprise must thus be found between the retaining force exerted by the tension spring and the release force. Relatively high frictional forces that occur at the points of friction between latch spring and latch stop, particularly at the free end of the latch spring, nonetheless continue to be unavoidable. This situation can lead to increased abrasion that forms an additional risk of contamination in the interior of the magnetic disc storage.

SUMMARY AND OBJECTS OF THE INVENTION

It is therefore the object of the present invention to create a rotational positioner means of the species initially cited that has an improve latch means in comparison to known solutions, that is constructed in an optimally simple way and that nonetheless operates reliably.

In a rotational positioning means for a magnetic disc storage including a swivel member which is seated, for example, in a base so that it is rotationally movable. The swivel member carries the magnetic heads for the magnetic disc storage, and a movable element of a drive system of the rotational positioner is fixed to the swivel member. A latch which blocks the movement of the swivel member in an idle position is provided, the latch being composed of a latch element which deflects in a direction opposite a spring pre-stress direction as well as a retainer element of the swivel member which is engaged to the latch element when the swivel member is in the idle position. The retainer element is disengaged from the latch element when the swivel member moves form the idle position into an operating position by the drive system forcing a release motion.

The above stated and other objects of the invention are achieved by a magnetic disc storage as described in the foregoing which includes, in particular, a rigidly formed retainer element and a latch element comprised of a leaf spring clamped at one end and arranged with reference to the swivel member so that the leaf spring deforms in a first phase of release motion of the swivel member occurring opposite the moving direction of the operating position and thereby disengages the latch element. The latch is formed so that the latch element initially detaches friction free from the retainer element into an enabled position so that the retainer element, in a following second phase of release motion given maximum acceleration of the swivel member in the opposite moving direction, enters the operating position by passing the latch element in non-contacting fashion. The retainer element subsequently drops back into the latched position.

This solution likewise does not require any latch or enable magnets for an operationally reliable latch means of a rotational positioner. The solution of the invention is thereby especially simple in structural terms and avoids the source of error of limited latching forces that can be overcome by an impact motion of the swivel member. In accord with the invention, by contrast, the release of the swivel member of the rotational positioner means is produced by a bipolar pulse. The coil of the magnetic drive system is excited such with the first polarity of a prescribed direction thereof that the swivel member is moved beyond the latched position. The spiral spring is thereby deflected, so that the latch element releases the retainer element. During the duration of the following, second polarity of the enable pulse, a maximum coil current having the opposite direction is supplied to the magnetic coil of the magnetic drive system. The swivel member is thereby maximally accelerated out of the momentary final position. The latch element that thus becomes free again follows the motion of the swivel member with a certain delay, so that the retainer element has already moved out of the engaging region of the latch element before the latter re-assumes its latched position. As soon as the swivel member has thus moved the magnetic heads out of the idle position, a positioner control assumes the control of the motion sequences of the positioner means in a conventional way.

As set forth above, it is of critical significance, on the one hand, that no compromise between retaining and release forces need be defined in the solution of the invention. Added thereto, on the other hand, is that the enable of the retainer element, i.e. the disengagement from the latched position, ensues without frictional forces between the retainer element and latch element and abrasion is therefore not possible here, either. In the solution of the invention, the release forces act essentially nearly punctiform on the spiral spring of the latch element, so that the risk of an undesired abrasion is minimized.

Developments of the invention further include the latch comprising a stop angle for limiting the rotation of the swivel member in the latched position. A damping element may also be provided fixed to the stopping angle lying opposite the swivel member. In greater detail, the latch element is itself formed as a latch spring having a free end comprising a catch hook which is angled off in a direction toward a swivel axis of the swivel member. The latch spring is also crimped in a step shape between the catch hook and its clamping location and thus forms a stopping surface directly obliquely against the moving direction of the swivel member. The circumferential, or outermost, surface of the swivel member is provided with a leading bevel which corresponds in shape to this stopping surface of the latch spring. In a further development, the spacing between the stopping surface of the latch spring and the clamping location is small in comparison to the spacing between the stopping surface and the catch hook.

Further developments of the invention include increasing the mass moment of inertia via a damping element affixed to the catch spring. In addition thereto, or as an alternate arrangement, a damping arrangement in the form of a damping chamber which is essentially tightly closed without friction by a latch spring is arranged so that the latch spring varies the volume of the chamber giving elastic deformation of the spring.

The latch element may be formed with a latch stop which is seated rotationally mobile parallel to the axis of the swivel member, the latch stop including a catch projection and its long side facing the swivel member and adjacent to one end. The leaf spring of the latch element is clamped at the other end of this long side of the latch stop. In this embodiment, the leaf spring is slotted along its axis in the region of the passage of the retainer element and a further stop is rigidly arranged at the housing for limiting the rotational movement of the latch stop in the latched position. This embodiment is characterized by a further stop arranged between one end of the longitudinal side of the latch stop and the spring, the spring being bent over at its free end and supporting itself on this further stop. In addition, the leaf spring is fixed at the long side of the latch stop with a fastening plate that is, in turn, rigidly connected to the latch stop. Together with their advantages, they shall be set forth in greater detail below in the description of exemplary embodiments of the invention with reference to the drawing.

BRIEF DESCRIPTION OF THE DRAWINGS

FIG. 2 a detailed view of this rotational positioner means, particularly in view of the latch means utilized therein;

FIG. 4 a further detail view of a fashioning of the tooth profiles of a retainer element and of a catch nose of the latch means latched thereto;

DESCRIPTION OF THE PREFERRED EMBODIMENTS

Figure 1:
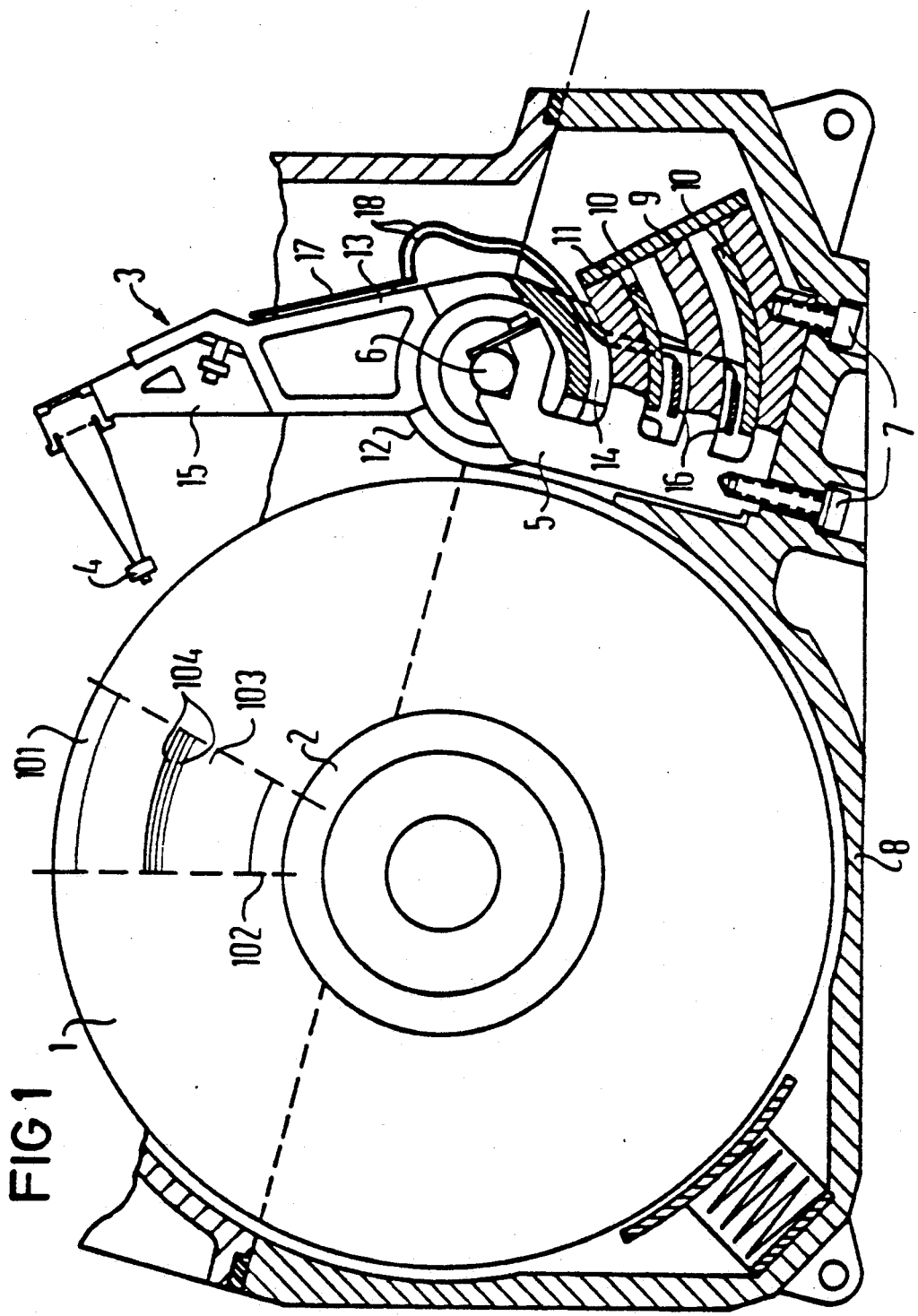
FIG. 1 a sectional view schematically showing the structure of a conventional magnetic disc storage having a rotating disc pack and a rotational positioner means allocated thereto.

FIG. 1 shows a magnetic disc storage in a section together with its essential structural units. A magnetic disc pack 1 is schematically shown, this rotating on a hub 2 in arrow direction. A rotational positioner that carries the magnetic heads 4 is laterally arranged next to the magnetic disc pack 1. For reasons of clarity, the rotational positioner is shown simplified in this illustration and in an assembly position withdrawn from the magnetic disc pack 1.

The rotational positioner 3, for example, comprises a U-shaped pillow block 5 at whose leg ends a positioner axis 6 is defined parallel to the axis of the magnetic disc pack 1. The pillow block 5 is arranged at an inside wall of a housing 8 of the magnetic disc storage with fastening screws 7.

When the rotational positioner 3 is fashioned according to the swivel coil principle, as in the present exemplary embodiment, then a part of a magnetic drive system of the rotational positioner 3 is integrated in the pillow block 5. A magnet core 9 fashioned as a section of an annulus is visible in the partial section of FIG. 1. Correspondingly shaped permanent magnets 10 are arranged concentrically thereto at both sides of the magnet core 9. A return plate 11 is fixed at the free ends of the magnet core 9 or, respectively, of the permanent magnets 10 as magnetic yoke.

A swivel member 12 is rotationally seated on the positioner axis 6. This swivel member 12 comprises swivel arms 13 or, respectively, carrier arms 14. A respective pair of magnetic heads 4 is resiliently fixed at each of the swivel arms via a base plate 15. A magnetic coil 16 is arranged at the carrier arms 14 embracing the magnet core 9.

The magnetic heads 4 are normally swivelled in into the magnetic disc pack 1 and are thus respectively positioned over one of the surfaces of the individual magnetic storages discs of the disc pack 1. It is schematically indicated in FIG. 1 that every surface of a storage disc of the magnetic disc pack 1 is divided into three regions in a radial direction. The actual data region 13 having a plurality of data tracks 104 lies between an outer edge zone 101 and an inner edge zone 102. In the write/read condition of the magnetic disc storage, the magnetic heads 4 fly over the storage discs of the magnetic disc pack 1 on an air cushion. This air cushion collapses below a critical speed of the magnetic disc pack 1 and the magnetic heads 4 land on the surfaces of the magnetic disc pack 1. In order to avoid damage in the data region 103, the inner edge zone 102 is defined here as a landing zone.

In order to assure this landing in the defined landing zone, the rotational positioner 3, as known, is automatically swivelled into an idle position when the magnetic disc pack 1 is taken out of operation but is also swivelled there into in case of an error. Latch means are usually provided that prevent a rotational motion of the rotational positioner 3 until the magnetic disc pack 1 given renewed activation again rotates with a speed that lies above the critical speed.

In an excerpted portion, FIG. 2 shows a detailed view of the described rotational positioner 3 with such a latch means. A flex spring that is fixed at one side to the pillow block 5 or, respectively, to the return plate 11 thereof with screws 20 and that is referred to below as a latch spring is arranged as a latch element 19 in the swivel plane of one of the carrier arms 14 of the rotational positioner 3. At its free end, the latch spring 19 comprises catch hooks 21 angled off in the direction of the positioner axis 6. In the middle section between this catch hook 21 and the fastening end, the latch spring 19 is crimped at approximately 45° and thus forms a stop face 22 that resides obliquely in the rotational region of the carrier arm 14. As shown in FIG. 2, this stop face 22 is preferably arranged in the close proximity of the fastening end of the latch spring 19.

This latch means has a retaining element 23 allocated to it that, essentially radially directed, projects from the outer limiting surface of the carrier arm 14. It is rigidly fashioned and arranged such that, given the rotational movement of the rotational positioner 3 into its idle position, i.e. a counter-clockwise rotational movement in the example, it runs onto the catch hook 21 of the latch spring 19, deflects this catch hook 21 while elastically deforming the latch spring 19 and, ultimately engages therewith.

A detent angle 24 is fixed on the return plate 11 of the pillow block 5. This detent angle 24 is fashioned such and arranged such that its limits the rotational motion of the rotational positioner 3 when it returns into its idle position. A damping element 25 is preferably arranged on that surface of the detent angle 24 facing toward the lateral surface of the carrier arm 14.

FIG. 3 again schematically shows the principle of the latch means just set forth, but now in the idle position of the rotational positioner 3. The illustration of FIG. 3 shows that the stopping surface 22 of the latch spring 19 corresponds to a leading bevel 26 of the carrier arm 14.

Figure 3:
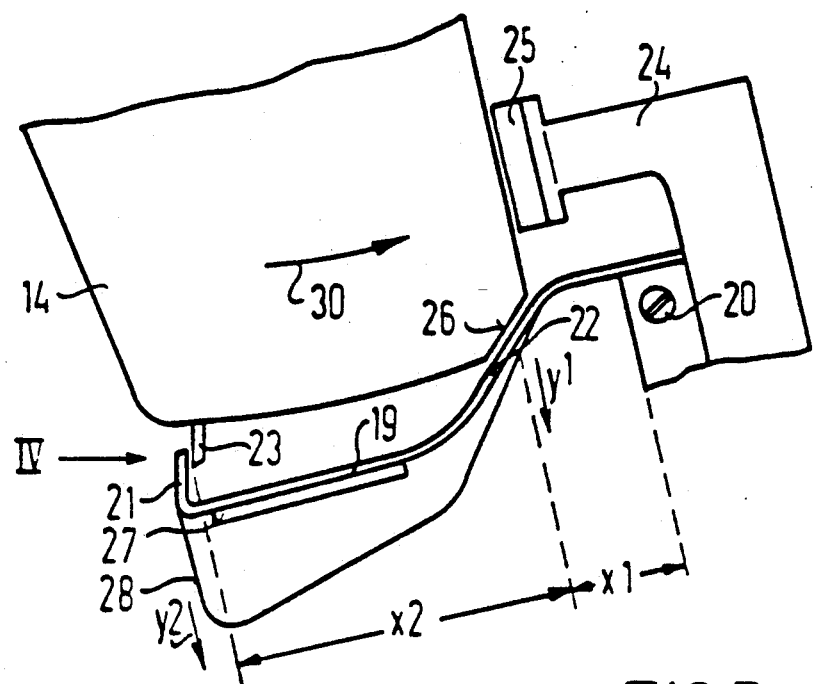
FIG. 3 a function sketch of the latch means in a further detailed view.

Over and above this, FIG. 3 shows further, possible fashionings of the latch means for influencing the spring characteristic or, respectively, the mass moment of inertia. The effective elastic force is especially defined by the elasticity of the material employed for the latch spring 19; however, it can also be influenced by, for example, an additional mass element 27 and/or in that an air chamber 28 is provided that is relatively tightly closed by the latch spring 19 but in an optimally friction-free fashion.

FIG. 3 further shows kinematic relationships. The overall resilient length of the latch spring 19 corresponds to the spacing of the catch hook 21 from the fastening point of the latch spring 19 at the return plate 11. In FIG. 3, the spacing of the stopping surface of the latch spring 19 from this fastening point is referenced xl and the spacing of the catch hook 21 from the stopping surface 22 is referenced x2. The sum of these spacings x1 and x2 yields the effective spring length of the latch spring 19; x1 is thereby selected significantly smaller than x2. The relationship between these spacings then also defines the relationship of a spring path y2 of the catch hook 21 relative to the resilient excursion in the region of the stopping surface 22, as is immediately apparent.

FIG. 4, finally, illustrates further detail of the fashioning of the latch means in a side view of the catch hook 21 and of the retainer element 23 in the direction of an arrow IV according to FIG. 3. This excerpted, detailed view illustrates an end face 29 of the catch hook 21 fashioned as bezel that is obliquely cut with reference to the correspondingly shaped end face of the retainer element 23. This allows the frictional losses during the deflection of the latch spring 19 by the retainer element 23 when the rotational positioner 3 enters into its idle position to be largely reduced.

Figure 5:
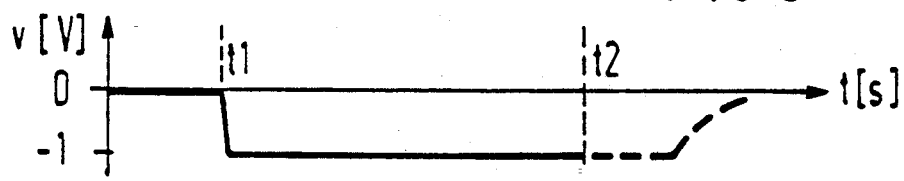
FIG. 5 a first pulse diagram that schematically shows a corresponding voltage curve at the excitation coil of the magnetic drive system when the rotational positioner means enters into the idle position.

The pulse diagrams of FIG. 5 and, respectively, 6, finally, illustrate the function of the magnetic drive system of the rotational positioner 3 when entering into its idle position or, respectively, when being unlatched from the idle position. FIG. 5 thereby shows the pulse shape for the regulated voltage v that is supplied to the magnetic coil 16 via the leads 18 in order to return the rotational positioner 3 into its idle position. When the magnetic disc storage is shut off, the correspondingly regulated voltage v is often generated from the kinetic energy of the disc pack that is still running. Even given power outage, thus, an adequately regulated voltage v is thus nonetheless available in order to reliably return the rotational positioner 3 into its idle position.

FIG. 5 shows this function insofar as it is of interest here. When the magnetic disc storage is taken out of operation at a time t1, then the magnetic coil 16—beginning at this time—is supplied with a regulated voltage v having a relatively slight, negative amplitude which can be assumed to amount to—1 V in the example. As a consequence of this voltage v, the magnetic drive system of the rotational positioner 3 is excited in such fashion that the swivel member 12 swivels into the idle position with moderate speed. It is assumed in the example that this position is reached at a later time t2. On the basis of the dimensioning of the time axis t in a scale of seconds, it is shown in FIG. 5 that this process of swivelling the rotational positioner 3 into its idle position is accomplished relatively slowly.

Figure 6:
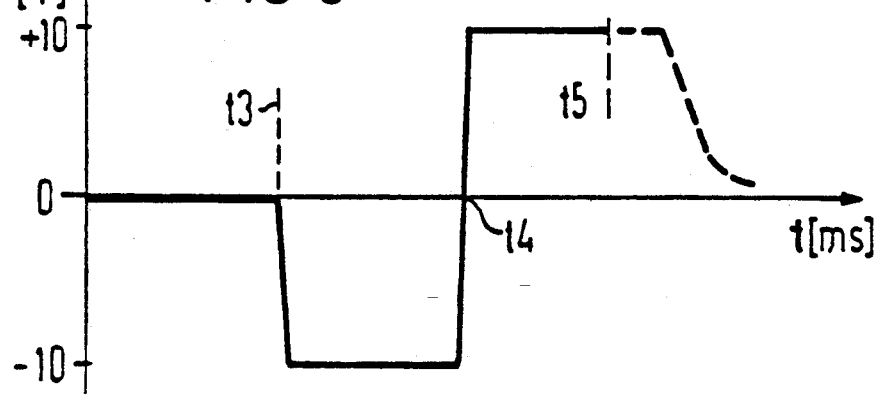
FIG. 6 a second pulse diagram that illustrates the voltage curve at the excitation coil of the magnetic drive system of the rotational positioner means for enabling the rotational positioner means when the magnetic disc storage is placed in operation.

The bipolar sequence for the regulated voltage v shown in FIG. 6 characterizes the excitation conditions of the magnetic drive system 9, 10, 16 of the rotational positioner 3 in order to produce the unlocking of the swivel member 12. When the magnetic disc storage is placed in operation, the drive for the magnetic disc pack 1 is first activated. The lifting forces that separate the magnetic heads 4 from the allocated surfaces of the magnetic disc pack 1 form during the run-up of the magnetic disc pack 1. The locking of the swivel member 12 of the rotational positioner 3 can be cancelled as soon as this floating condition of the magnetic heads 4 is reached.

In order to produce this, the magnetic coil 16 of the rotational positioner 3 is supplied with a strong voltage pulse having negative polarity at a time t3. The polarity of the voltage v is thereby identical to the polarity of the voltage pulse that led to the swivelling of the rotational positioner 3 into its idle position. Given this excitation of the magnetic drive system, thus, the swivel member 12 is moved farther in the direction of the arrow 30 with a torque that corresponds to this excitation. During this rotational movement limited only by the stopping angle 24, the leading bevel 26 of the carrier arm 14 presses with full force against the stopping surface 22 of the latch spring 19 and deflects it. The retainer element 21 thereby releases the catch nose 23.

At time t4, the polarity of the voltage v at the magnetic coil 16 is reversed and the magnetic coil 16 is thus supplied with a pulse having positive polarity and high amplitude. As a result thereof, the swivel member 12 is moved with high acceleration opposite the direction of the arrow 30, so that the retainer element 23 runs past the catch hook 21 before the latch spring 19 springs back after it is released by the leading bevel 26 of the carrier arm 14. The magnetic heads 4 have reached a selected track at a time t5. All further motion sequences of the positioner means 3 are controlled in a conventional way by a positioner controller. The rotational positioner 3 is freely positional in its swivelled-out condition as long as it is not returned into the idle position.

Figure 7:
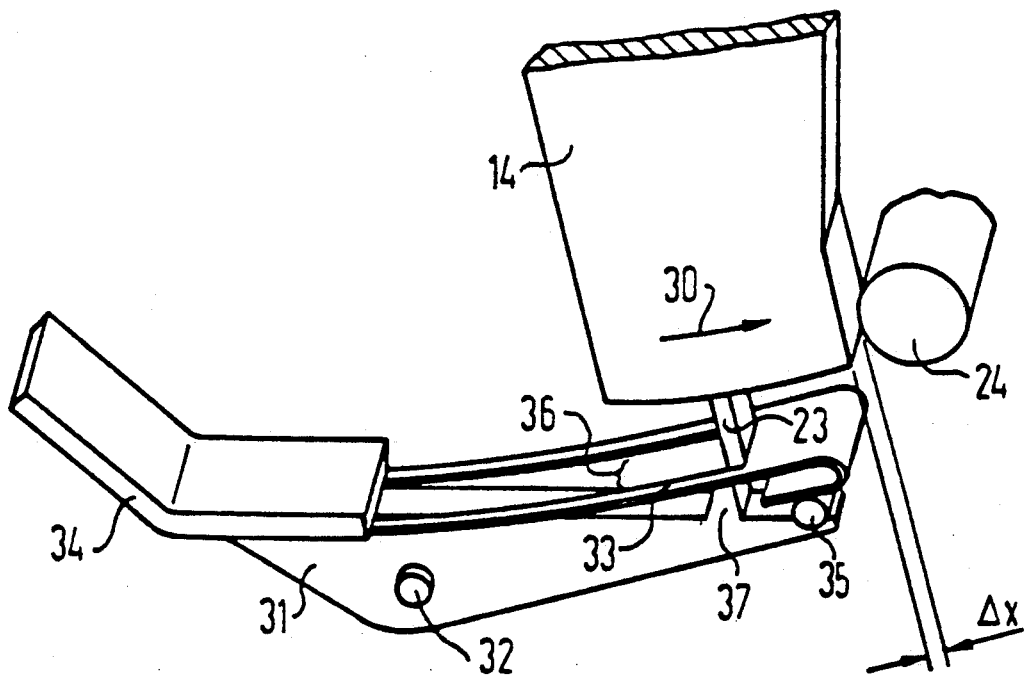
FIG. 7 a further exemplary embodiment of an inventively fashioned latch means.

A three-dimensional view of a further exemplary embodiment of the latch means is shown in FIG. 7. For reasons of clarity, only portions of the swivel member 12 with a carrier arm 14 are schematically shown while avoiding superfluous details that, in particular, also already derive from FIG. 2. The retainer element 23 projects radially from the carrier arm 14. In this exemplary embodiment, the latch means comprises a latch stop 31 that is seated rotationally movable on a rigid axis 32 that is rigidly arranged at the housing and parallel to the axis of the positioner axis 6.

A tension spring 33 is arranged at that long side of the latch stop 31 facing toward the carrier arm 14 of the swivel member 12. The tension spring 33 has one side clamped between a fastening plate 34 and the latch stop 31 at an end of the long side of the latch stop 31 close to the pivot point, whereby the fastening plate 34, for example, is fixed to the latch stop 31 with an electron beam welded connection. At its free end lying opposite the clamped end, the tension spring 33 is bent over U-shaped and lies against a stop pin 35 that is rigidly arranged at the housing and forms a rotational limitation for the latch stop 31. Further, the tension spring 33 is fashioned at least partially slotted between its clamping location and its free end. In the latched position shown in FIG. 7, the tooth-shaped retainer element 23 engages through this slot 36 and is engaged with the catch nose 37 that projects from the long side of the latch stop 31.

In the latched position shown in FIG. 7, the back side of the carrier arm 14 is at a prescribed spacing from the stop 24 that forms the rotational limitation of the swivel member 12, this stop 24 being executed here as a stop pin rigidly arranged at the housing. This spacing is identical to the elevation distance Δx of the carrier arm 14 during the first phase of the release motion. As in the first exemplary embodiment, the carrier arm 14 is moved toward the stop 24 in the direction of the arrow 30 in the first phase of the release motion. The tooth-shaped retainer element 23 moves counter-clockwise together with the carrier arm and entrains the tension spring 32 in that it attacks at the end of the slot 36. As a result, the retainer element 23 lifts off from the engaging edge of the catch nose 37 and deflects the latch stop 31 in clockwise direction due to engagement at the tension spring 32. The elevation distance Δx is dimensioned such relative to the swivel motion of the latch stop that the retainer element 23 is no longer in engagement with the catch nose 37 of the latch stop 31 at the end of the elevation distance.

In combination with the prestress of the tension spring 32, the mass of the latch stop 31 is dimensioned such that the retainer element 23 flies freely past the catch nose 37 only when the swivel member 12 and, thus, its carrier arm 14 as well is moved into the operational position with full acceleration by the drive system of the rotational positioner during the second phase of the release motion—the moving direction of the carrier arm 14 then proceeds in clockwise direction directed opposite the arrow 30. The same conditions as already set forth in conjunction with FIG. 5 and, in particular, FIG. 6 are also valid in the release motion, so that repetition is unnecessary here. Here, too, however, it is just as critical that the disengagement from the latched position is not triggered by forces that overcome the latched position but by an oppositely directed motion. Insofar as this oppositely directed motion—caused, for example, by a jolt—does not ensue in combination with a maximum acceleration in the opposite moving direction, it remains ineffective because the catch stop 31 falls back into its latched position before the retainer element 23 has travelled past the catch nose 37.

Although other modifications and changes may be suggested by those skilled in the art, it is the intention of the inventors to embody within the patent warranted hereon all changes and modifications as reasonably and properly come within the scope of their contribution to the art.

List of Reference Characters

| | |
|---|---|
| 1 | magnetic disc pack |
| 2 | hub |
| 3 | rotational positioner |
| 4 | magnetic heads |
| 5 | pillow block |
| 6 | positioner axis |
| 7 | fastening screws |
| 8 | housing |
| 9 | magnet core |
| 10 | permanent magnets |
| 11 | return plate |
| 12 | swivel member |
| 13 | swivel arms |
| 14 | carrier arms |
| 15 | base plate |
| 16 | magnetic coil |
| 101 | outer edge zone |
| 102 | inner edge zone |
| 103 | data region |
| 104 | data tracks |
| 17 | printed circuit board |
| 18 | leads |
| v | regulated voltage |
| 19 | latch spring |
| 20 | screws |
| 21 | catch hook |
| 22 | stopping surface |
| 23 | retainer element |
| 24 | stop angle |
| 25 | damping element |
| 26 | leading bevel of 14 |
| 27 | additional mass element |
| 28 | air chamber |
| x1 | spacing of stopping surface 22 from 20 |
| x2 | spacing of stopping surface 22 from 21 |
| y1 | resilient excursion of 22 |
| y2 | spring path of 21 |
| 29 | end face of 21 |
| 30 | arrow for the rotational movement of 3 into the idle position |
| t1, t2 | times during the motion sequence for locking 3 |
| t3, t4 | times during the motion sequence for unlocking 3 |
| t5 | point in time for unlocked condition |
| 31 | latch stop |
| 32 | rigid axis |
| 33 | tension spring |
| 34 | fastening plate |
| 35 | stop pin |
| 36 | slot in 33 |
| 37 | catch nose of 31 |
| Δ1 | elevation distance |

I claim:

1. A rotational positioner for a magnetic disc storage, comprising: a base; a swivel member seated rotationally movable on said base and carrying magnetic heads; a drive system; a movable element of said drive system of the rotational positioner means fixed to said swivel member, and a latch means for blocking said swivel member in an idle position, said latch means comprising a latch element deflectable opposite a spring pre-stress and a retainer element of the swivel member engaged thereto in the idle position and that can be disengaged from the idle position into an operating position with a release motion forced by the drive system, the retainer element being rigidly fashioned and the latch element comprising a leaf spring clamped at one side and arranged such with reference to the swivel member that said leaf spring deforms in a first phase of the release motion of the swivel member occurring opposite a moving direction into an operating position and thereby disengages the latch element, initially detaching friction-free from the retainer element, into an enable position, so that the retainer element, in a following, second phase of the release motion given maximum acceleration of the swivel member in the opposite moving direction, enters into the operating position passing—in non-contacting fashion—the latch element that subsequently drops back into a latched position.

2. A rotational positioner according to claim 1, wherein said latch means comprises a stopping angle positioned to limit rotation of the swivel member in the latched position.

3. A rotational positioner according to claim 2, further comprising: a damping element fixed at the stopping angle lying opposite the swivel member.

4. A rotational positioner according to claim 2, wherein said latch element comprises a latch spring whose free end comprises a catch hook angled off in a direction toward a swivel axis of the swivel member and which latch spring is also crimped step-shaped between this catch hook and its clamping location and thus has a stopping surface directed obliquely against the moving direction of the swivel member; and a leading level corresponding to this stopping surface being provided at a circumferential surface of the swivel member.

5. A rotational positioner according to claim 4, wherein a spacing between the stopping surface of the latch spring and the clamping location thereof is small in comparison to a spacing between the stopping surface and the catch hook.

6. A rotational positioner according to claim 1, further comprising: a damping element that increases a mass moment of inertia additionally fixed on the catch spring.

7. A rotational positioner according to claim 4, wherein said latch means comprises a damping arrangement in the form of a damping chamber that is essentially tightly closed without friction by the latch spring and is arranged such that the latch spring varies a volume of said damping chamber given an elastic deformation.

8. A rotational positioner according to claim 1, wherein said latch element comprises a latch stop seated rotationally mobile parallel to an axis of the swivel member, said latch stop comprising a catch projection at its long side facing toward the swivel member and adjacent to its one end; the leaf spring of the latch element being clamped at another end of this long side of the latch stop, said leaf spring being slotted along its axis in a region of passage of the retainer element; and a further stop rigidly arranged at a housing provided for limiting rotational movement of the latch stop into the latched position.

9. A rotational positioner according to claim 8, further comprising: a further stop arranged between one end of a longitudinal side of the latch stop and said leaf spring; and said leaf spring being bent over at its free end and supporting itself on this further stop.

10. A rotational positioner according to claim 8, wherein said leaf spring is fixed at a long side of the latch stop with a fastening plate that is in turn rigidly connected to the latch stop.

* * * * *